United States Patent
Yuan et al.

(10) Patent No.: US 7,069,429 B2
(45) Date of Patent: Jun. 27, 2006

(54) METHOD AND CONTROL APPARATUS FOR ASSIGNING ID NUMBERS TO IDE DEVICE

(75) Inventors: Ming-Huan Yuan, Tu-chen (TW); Ting-Hsien Chen, Tu-Chen (TW); Yu-Ming Lang, Tu-chen (TW)

(73) Assignees: Hon Fu Jin Precision IND (Shenzhen) Co., Ltd., Shenzhen (CN); Hon Hai Precision Ind. Co., Ltd., Taipei Hsien (TW)

( * ) Notice: Subject to any disclaimer, the term of this patent is extended or adjusted under 35 U.S.C. 154(b) by 269 days.

(21) Appl. No.: 10/637,823

(22) Filed: Aug. 7, 2003

(65) Prior Publication Data

US 2004/0098574 A1 May 20, 2004

(30) Foreign Application Priority Data

Nov. 20, 2002 (TW) ................................ 91133788 A

(51) Int. Cl.
*G06F 9/24* (2006.01)
(52) U.S. Cl. ................... 713/1; 710/8; 710/10; 710/21; 710/310; 710/330
(58) Field of Classification Search .................. 713/1, 713/2, 100, 300, 310, 320, 321, 322, 323, 713/324, 330, 340, 375, 400, 401, 500, 501, 713/502, 503, 600, 601; 710/3, 8, 9, 10, 710/42
See application file for complete search history.

(56) References Cited

U.S. PATENT DOCUMENTS

| | | | |
|---|---|---|---|
| 5,721,840 A * | 2/1998 | Soga | 710/310 |
| 5,778,252 A * | 7/1998 | Sangveraphunsiri et al. | 710/21 |
| 6,401,223 B1 * | 6/2002 | DePenning | 714/42 |
| 6,553,432 B1 * | 4/2003 | Critz et al. | 710/10 |
| 6,868,501 B1 * | 3/2005 | Saitou et al. | 713/330 |
| 2002/0069335 A1 * | 6/2002 | Flylnn, Jr. | 711/153 |
| 2003/0154330 A1 * | 8/2003 | Bolt | 710/8 |

* cited by examiner

*Primary Examiner*—A. Elamin
*Assistant Examiner*—Fahmida Rahman
(74) *Attorney, Agent, or Firm*—Wei Te Chung

(57) ABSTRACT

The present invention provides a method and a control apparatus (1) for assigning ID numbers to a number of IDE devices (31–38) included in one network server. The control apparatus includes a host electronic circuitry (10), a plurality of controllers (21–24) electrically connecting to the host electronic circuitry, the plurality of IDE devices (31–38), a plurality of power switches (41–48) and a plurality of display devices (61–68). The host includes a plurality of sets of ID indication pins and an ID set pin, and each controller electrically connects with and controls a pair of IDE devices. Prior to boot up, the user sets jumpers in the host to assign unique values to the sets of ID indication pins. The controllers read the values and then assign unique ID numbers to the IDE devices. The IDE devices spin up in a sequence determined by their assigned ID numbers.

13 Claims, 3 Drawing Sheets

METHOD AND CONTROL APPARATUS FOR ASSIGNING ID NUMBERS TO IDE DEVICE

RELATED APPLICATION

The present invention is related to a co-pending patent application Ser. No. 10/335,319, and entitled "Method And Control Apparatus for Controlling Startup of Multiple IDE_HDDs", whose disclosure is incorporated herein by reference.

BACKGROUND OF THE INVENTION

1. Field of the Invention

The present invention relates to a method and an apparatus usable in network external storage, and more particularly to a method and an apparatus usable in Network Attached Storage (NAS).

2. Related Art

As information technology develops and encompasses new, multimedia applications, the amount of data moving between different system platforms increases geometrically. Conventional network storage structures using servers as main memory devices cannot cope with data streams so large. Therefore, a new pattern of data storage, independent from the storage devices it relies on, which can provide good expandability, availability and reliability, is desired. To meet this need, the Network Attached Storage (NAS) pattern was invented and generally uses a plurality of hard disk drives (HDDs) as external storage devices.

An HDD comprises a storage medium, e.g., a hard disk, a read/write head, a spindle motor that rotates the storage medium, and a circuit board. The circuit board includes a connector to connect the HDD to an interface board of a computer system. The Integrated Device Electronics (IDE) interface is a defacto standard interface for connecting HDDs to computer systems. An HDD that conforms to the IDE standard will be referred to as an "IDE_HDD". Currently, HDDs used in NAS are normally IDE_HDDs. The IDE standard allows two IDE_HDDs to connect to a single interface board to form an IDE channel, wherein one is generally called "master" and the other is called "slave". The interface board provides two ports for connecting two HDDs respectively. When two HDDs are installed, one HDD serves as a master HDD while the other serves as a slave HDD.

However, if eight IDE_HDDs are installed in the system, the peak starting current during boot-up can be up to 16A, since all the IDE_HDDs spin up together at the same time. A conventional power supply cannot endure so high a peak current and power consumption, and can easily burn out. A special power supply to supply the needed power increases the cost of the system. A control apparatus is desired to control the IDE devices to sequentially spin up using different assigned identification (ID) numbers. Accordingly, a method and a corresponding apparatus for assigning ID numbers to the IDE devices for use in such control apparatus is desirable.

SUMMARY OF THE INVENTION

An object of the present invention is to provide a method and an apparatus for assigning ID numbers to a number to IDE devices, whereby the IDE devices can be controlled to spin up in sequence in accordance with the assigned ID numbers.

To accomplish the above-mentioned objects, the present invention provides a method and a control apparatus for assigning ID numbers to a number of IDE devices included in one network server. The control apparatus includes a host electronic circuitry, a plurality of controllers electrically connecting to the host electronic circuitry, the plurality of IDE devices, a plurality of power switches and a plurality of display devices. The host includes a plurality of sets of ID indication pins and an ID set pin, and each controller electrically connects with and controls a pair of IDE devices. Prior to boot up, the user sets jumpers in the host to assign unique values to the sets of ID indication pins. The controllers read the values and then assign unique ID numbers to the IDE devices. The IDE devices spin up in a sequence determined by their assigned ID numbers.

Further objects and advantages of the present invention will become more apparent from a consideration of the drawings and the following detailed description.

DETAILED DESCRIPTION OF THE PREFERRED EMBODIMENT

Figure 1:
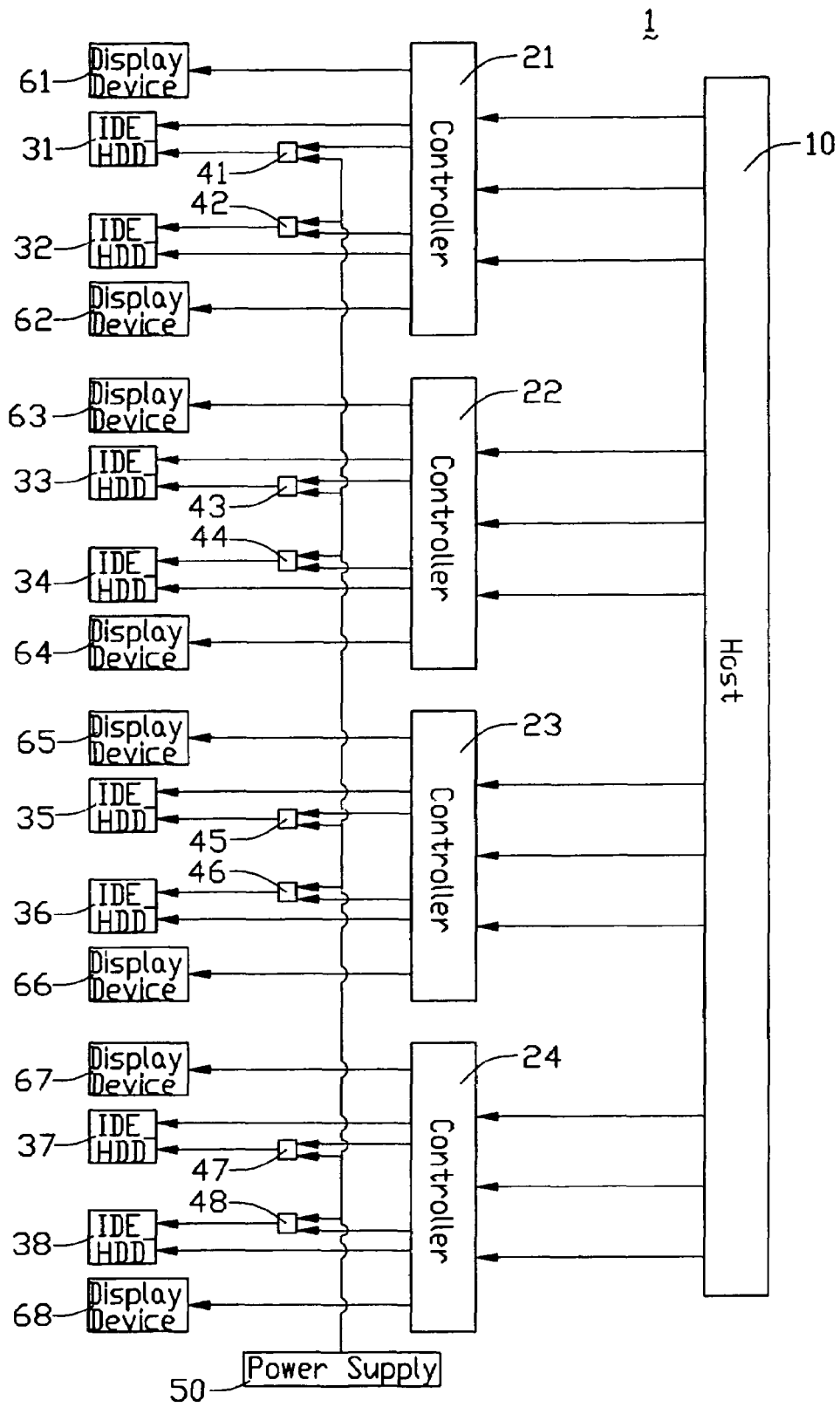
FIG. 1 is a block diagram of an apparatus for assigning ID numbers to a plurality of IDE devices.

Referring to FIG. 1, an apparatus for assigning ID numbers to a plurality of IDE devices in accordance with a preferred embodiment of the present invention includes a host 10, four controllers 21–24, four pairs of IDE devices 31–38, four corresponding pairs of power switches 41–48, and four corresponding pairs of display devices 61–68. In this detailed description, IDE devices refer to IDE_HDDs and the IDE_HDDs will be considered to be an integral component of the apparatus. Each controller controls a pair of IDE_HDDs through a pair of power switches, thereby forming an IDE channel (not labeled). A power supply 50 supplies electrical power for the IDE_HDDs through corresponding power switches.

Figure 2:
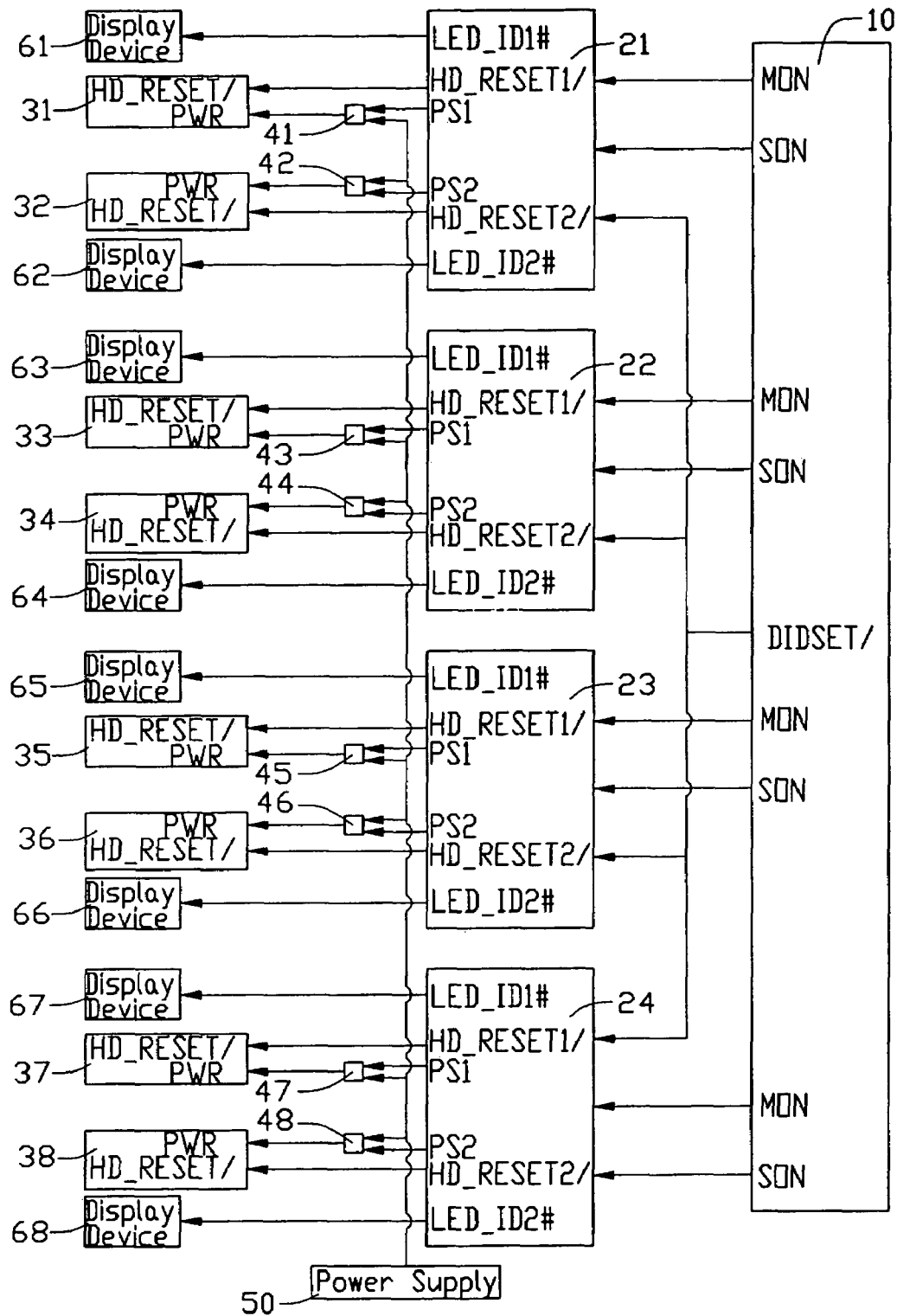
FIG. 2 is a detailed block diagram of FIG. 1.

Referring to FIG. 2, the host 10 provides a plurality of pins to respectively couple to corresponding controllers for exchange of information. The host 10 has ID indication pins MON and SON for each controller to indicate the ID number of the corresponding controller. The MON pin and the SON pin of each controller are separately set to a high level or to a low level by setting jumpers or by firmware. The host 10 further provides an ID set pin, DIDSET/. In this embodiment, when the DIDSET/pin is in a low-level state, the host 10 commands the controllers to get the corresponding ID number from the host 10. In another embodiment, when the DIDSET/pin is in a high-level state, the same response will be triggered.

Each controller 21–24 includes an HD_RESET1/pin and an HD_RESET2/pin for respectively connecting with an HD_RESET/pin on each of a corresponding pair of IDE_HDDs 31–38. Each controller 21–24 further provides an LED_ID1# pin and an LED_ID2# pin for respectively connecting with each of a corresponding pair of display devices 61–68. Through this means the controller can control the corresponding display devices to display some information, such as the assigned ID number, whether an IDE_HDD is present or not, and other information. Each IDE_HDD 31–38 has a PWR pin for receiving electrical power from the power supply 50. The turning on or off of the first power switches 41, 43, 45, 47 is controlled by a PS1 pin of controllers 21, 22, 23, 24, respectively. The turning on or off of the second power switches 42, 44, 46, 48 is controlled by a PS2 pin of controllers 21, 22, 23, 24, respectively. When a power switch 41–48 turns on, electrical power from the power supply 50 is connected to the PWR pin of the corresponding IDE_HDD 31–38.

In this embodiment, the MON and SON values are respectively set by setting jumpers to logic "1" and "0", which respectively represent the high and low voltage levels at the MON pin and the SON pin. Each pair of MON and SON pins can be set to one of four combinations of states, and each controller will be assigned a first ID number, called a PIC ID, according to the combination set on its corresponding MON and SON pins. The PIC ID numbers are assigned according to the following scheme:

| MON | SON | PIC ID |
|-----|-----|--------|
| 0   | 0   | 0      |
| 0   | 1   | 1      |
| 1   | 0   | 2      |
| 1   | 1   | 3      |

After PIC ID numbers are assigned, each controller assigns a second ID number, called a Device ID, to each IDE_HDD connected thereto, which Device ID depends on the corresponding PIC ID (first ID) number. The relationship between the first and second ID numbers is shown in the following table:

| MON | SON | PIC ID | Device ID |
|-----|-----|--------|-----------|
| 0   | 0   | 0      | 0,1       |
| 0   | 1   | 1      | 2,3       |
| 1   | 0   | 2      | 4,5       |
| 1   | 1   | 3      | 6,7       |

Figure 3:
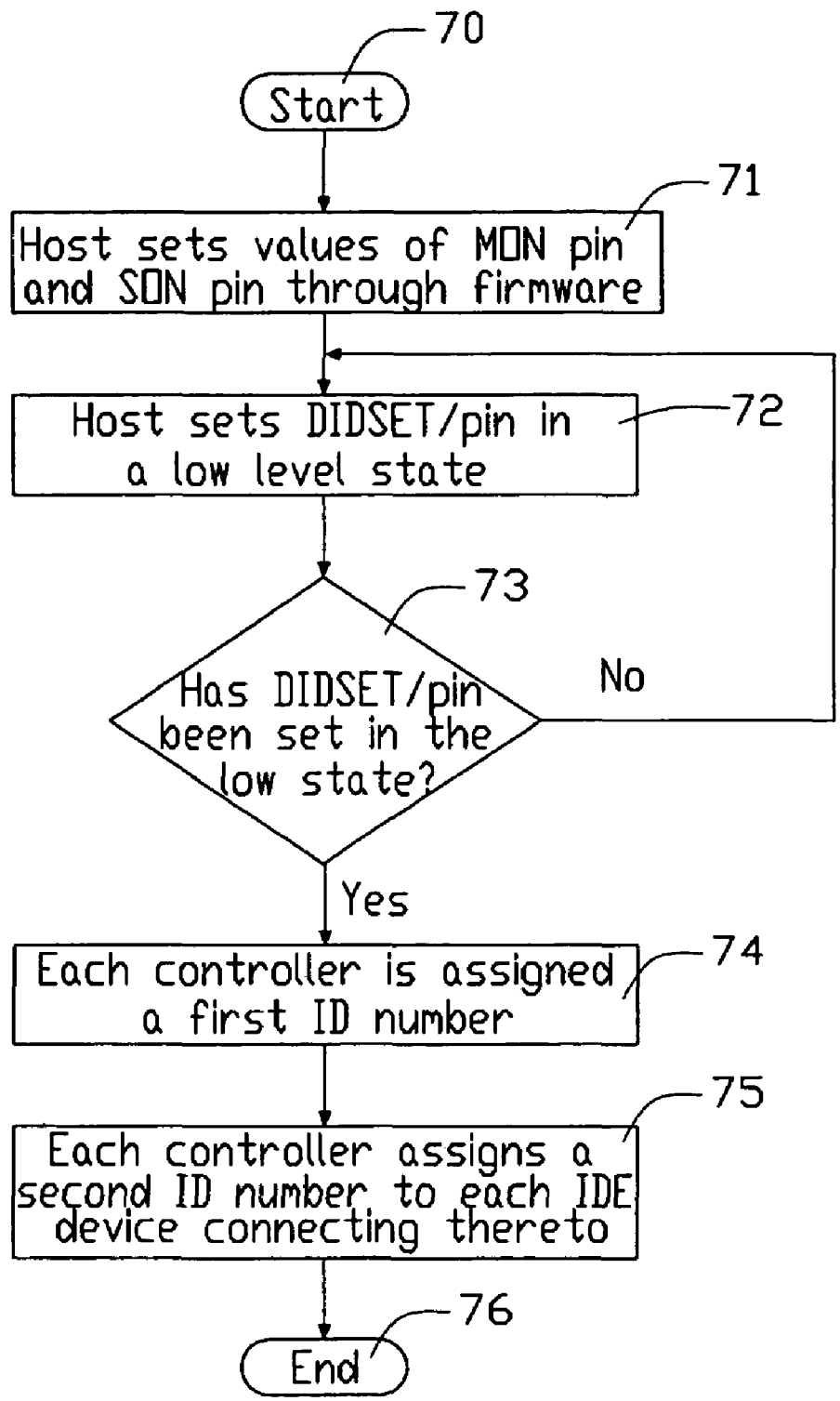
FIG. 3 is a flow diagram illustrating steps in assigning ID numbers to the IDE devices.

Referring to FIG. 3, a flow diagram shows the process steps performed by the apparatus of FIG. 2. The process begins at step 70 with the booting up of the host 10 and the controllers 21–24. Prior to boot up, the user has to set jumpers in the host 10 assigning the MON and SON values. If the MON and SON values are not jumper-set, they must be set by firmware during boot-up in step 71. Next, the process moves to step 72, where the host 10 sets the DIDSET/pin to a low level state within a designated period, for instance, 500 milliseconds. Subsequently, the process moves to step 73, where the host 10 verifies that the DIDSET/pin has been set in the low level state. If the DIDSET/pin is not in the low level state, the process returns to the step 72. If the DIDSET/pin is in the low level state, the process moves to step 74. At this step each controller reads the values at the corresponding MON and SON ID indication pins of the host 10 and accepts the assigned first ID numbers based on those values. The process then moves to step 75, where the controllers 21–24 assign second ID numbers to the IDE_HDDs connecting thereto, according to their own first ID numbers assigned by the host 10. In other words, the host indirectly designates the ID numbers of the individual IDE_HDDs. The process ends at step 76.

The method and apparatus in accordance with the present invention not only assigns each controller a first ID number, but also assigns each IDE device a second ID number. In addition, the second ID numbers can be displayed on the corresponding display devices. Users can identify which IDE devices are in work mode and what their ID numbers are. Furthermore, the IDE devices can be made to spin up in a controlled sequence according to the assigned ID numbers, thereby avoiding start-up currents so high that they can burn out the power supply 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A control apparatus adapted to assign identification (ID) numbers to a plurality of Integrated Device Electronics (IDE) devices, comprising:
   a host electronic circuitry including a plurality of sets of ID indication pins and an ID set pin;
   a plurality of controllers each electrically connecting to the ID set pin and to a corresponding set of ID indication pins of the plurality of sets of ID indication pins of the host electronic circuitry, each controller electrically connecting with and controlling a pair of IDE devices of the plurality of IDE devices; and
   a plurality of display devices, each of which corresponds to one IDE device, for displaying relevant operating information;
   wherein each set of ID indication pins assigns a unique, whole first ID number, the set of first ID numbers being continuous from 0 to x, where x+1 is a total number of the controllers; and
   wherein each controller further assigns a unique, whole number second ID number to each of the two IDE devices under its control, the second ID numbers in the entire control apparatus being continuous from 0 to y, where y+1 is a total number of the IDE devices.

2. The control apparatus as claimed in claim 1, wherein the IDE devices are IDE_HDDs which are hard disk drives (HDDs) conforming to the IDE interface.

3. The control apparatus as claimed in claim 1, wherein the display devices are LED-type display devices.

4. The control apparatus as claimed in claim 1, wherein the relevant operating information includes IDE working state of the IDE device and the corresponding second ID number.

5. The control apparatus as claimed in claim 1, wherein, when the ID set pin is in a low level state, the host commands each controller to get the corresponding first ID number from the host.

6. The control apparatus as claimed in claim 1, wherein, when the ID set pin is in a high level state, the host commands each controller to get the corresponding first ID number from the host.

7. A method for assigning ID numbers to a plurality of IDE devices ranged in pain of IDE devices, comprising steps of:
   (1) providing a host electronic circuitry including a plurality of sets of ID indication pins and an ID set pin, a plurality of controllers each electrically connecting to the ID set pin and to a corresponding set of ID indication pins of the plurality of sets of ID indication pins of the host electronic circuitry, each controller controlling and electrically connecting with a pair of IDE devices of the plurality of IDE devices;

(2) a user setting jumpers in the host electronic circuitry to assign unique values to the sets of ID indication pins;

(3) each controller reading the corresponding value and being assigned a first ID number according to the value of the corresponding set of ID indication pins; and (4) each controller assigning a unique second ID number to each IDE device connecting thereto according to its own first ID number.

8. The method as claimed in claim 7, wherein the IDE devices are IDE_HDDs which are hard disk drives (HDDs) conforming to the Integrated Device Electronics (IDE) interface.

9. A method for assigning ID numbers to a plurality of IDE devices arranged in pairs of IDE devices, comprising steps of:

(1) providing a host electronic circuitry including a plurality of sets of ID indication pins and an ID set pin, a plurality of controllers each electrically connecting to the ID set pin and to a corresponding set of ID indication pins of the plurality of sets of ID indication pins of the host electronic circuitry, each controller controlling and electrically connecting with a pair of IDE devices of the plurality of IDE devices;

(2) having a user set jumpers in the host electronic circuitry to assign values to the sets of ID indication pins;

(3) booting up the host electronic circuitry and the controllers;

(4) having the host set the ID set pin from a first state to a second state within a predetermined period;

(5) having the host verify that the ID set pin is in the second state, if the ID set pin is not in the second state, the process returning to step (4), and if the ID set pin is in the second state, having each controller read the value of the corresponding set of ID indication pins and accept a first ID number corresponding to the value; and (6) having each controller assign a second ID number to each IDE device connecting thereto according to its own first ID number.

10. The method as claimed in claim 9, wherein the first state disclosed in steps (4) and (5) is a high voltage level and the second state disclosed in steps (4) and (5) is a low voltage level.

11. The method as claimed in claim 9, wherein the first state disclosed in steps (4) and (5) is a low voltage level and the second state disclosed in steps (4) and (5) is a high voltage level.

12. The method as claimed in claim 9, wherein, instead of the values of the sets of ID indication pins being jumper-set, they are set by firmware during boot-up.

13. A control apparatus assembly comprising:

a host electronic circuitry including a plurality of sets of identification (ID) pins, each set of ID pins including N pins, wherein N is an integer and $\geq 2$, each of said pins being represented by either logic "1" or logic "0";

a plurality of controllers each connected to each corresponding set of ID pins, said each corresponding set of ID pins being labeled with a unique ID number according to the logic "1" or logic "0" of the pins thereof;

a plurality of sets of IDE (Integrated Device Electronics) devices each coupled to each corresponding controller, each set of IDE devices including M devices, wherein M is an integer and $\geq 2$, each of said IDE devices connected to the corresponding controller via a switch which is further linked to a power source; wherein there are $2^N$ controllers with different ID numbers from one another, and $2^N \times M$ IDE devices with different ID numbers from one another, so that the power source may activate each individual IDE device according to said different ID numbers thereof recognized by the host electronic circuitry.

* * * * *